United States Patent [19]
Darnell

[11] 4,262,431
[45] Apr. 21, 1981

[54] WORD BUILDING TEACHING AID

[76] Inventor: Eula K. Darnell, 307 Baldwin, West Helena, Ark. 72390

[21] Appl. No.: 11,865

[22] Filed: Feb. 13, 1979

[51] Int. Cl.³ .................... G09B 1/30; G09B 17/00
[52] U.S. Cl. ................................... 434/170; 434/172
[58] Field of Search ............... 35/35 R, 35 H, 35 J, 35/73, 71

[56] References Cited

U.S. PATENT DOCUMENTS

| 218,306 | 8/1879 | McNeill | 35/73 |
|---|---|---|---|
| 419,393 | 1/1890 | Wobus | 35/73 |
| 2,294,539 | 9/1945 | Cuddihy | 35/35 R |
| 2,369,804 | 2/1945 | Schoolfield et al. | 35/35 H |
| 3,654,712 | 4/1972 | Bagdasar | 35/71 X |
| 3,715,812 | 2/1973 | Novak | 35/35 J |
| 3,908,287 | 9/1975 | Darnell | 35/73 X |

Primary Examiner—Richard C. Pinkham
Assistant Examiner—Scott L. Brown
Attorney, Agent, or Firm—Berman, Aisenberg & Platt

[57] ABSTRACT

A teaching device useful in helping children, especially slow learners, in spelling, reading and pronunciation. The device includes a three-tiered case or housing having a movable drawer on each tier. Each drawer is divided into a plurality of compartments. In each compartment are placed a plurality of three-dimensional letter pieces which may be colored in a plurality of different colors to reflect different pronunciations in different words. One color code is provided for vowel pronunciation, while another color code is provided for consonant pronunciation. Additionally, the drawers may contain groups of connected letter pieces, consisting of two or more letters, to aid in forming words with common prefixes, suffixes, or intermediate letter groupings. The casing has the color code imprinted on one side thereof, and a syllable pronunciation aid imprinted on the other. On the back of the case are positioned small canvas boards upon which are imprinted additional phonics and writing information. The top of the case may be utilized as a work area.

11 Claims, 8 Drawing Figures

U.S. Patent  Apr. 21, 1981  Sheet 1 of 2  4,262,431
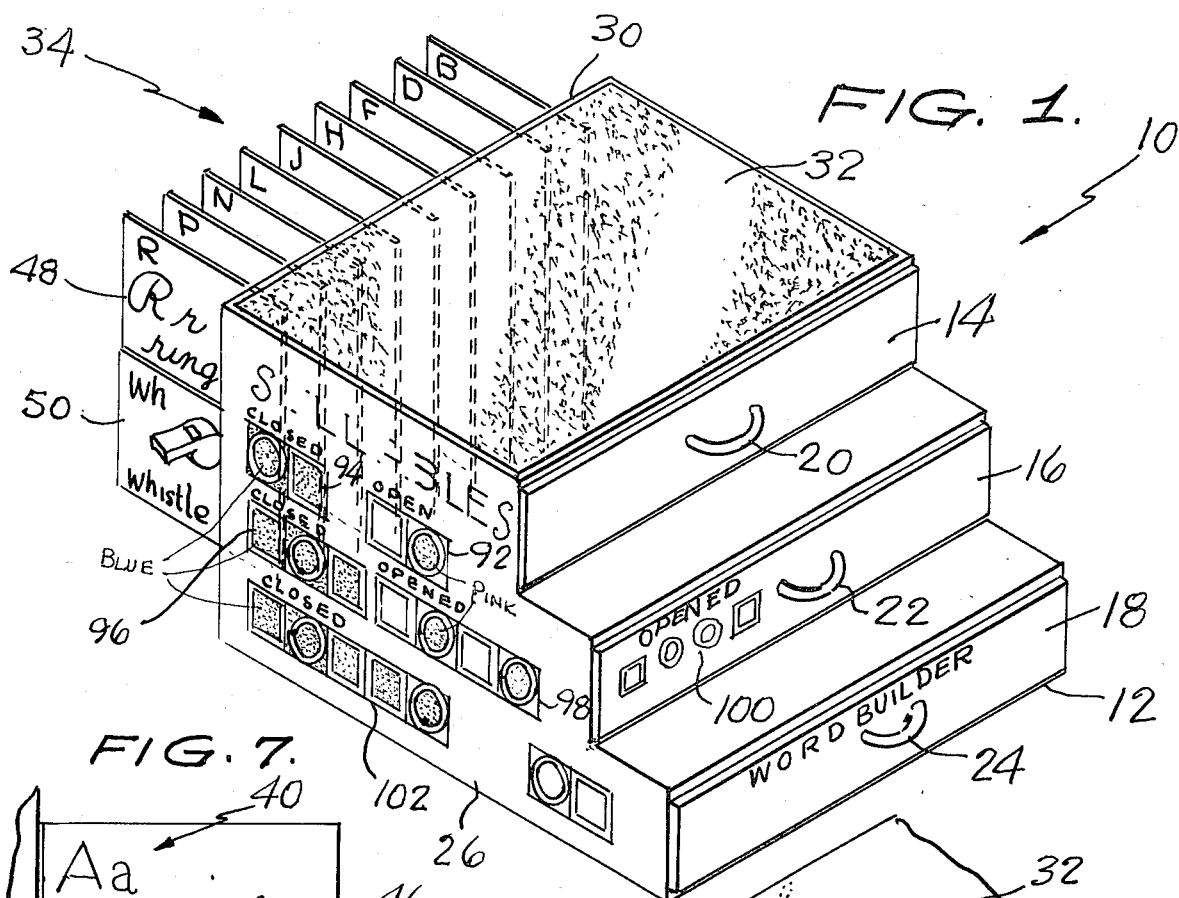
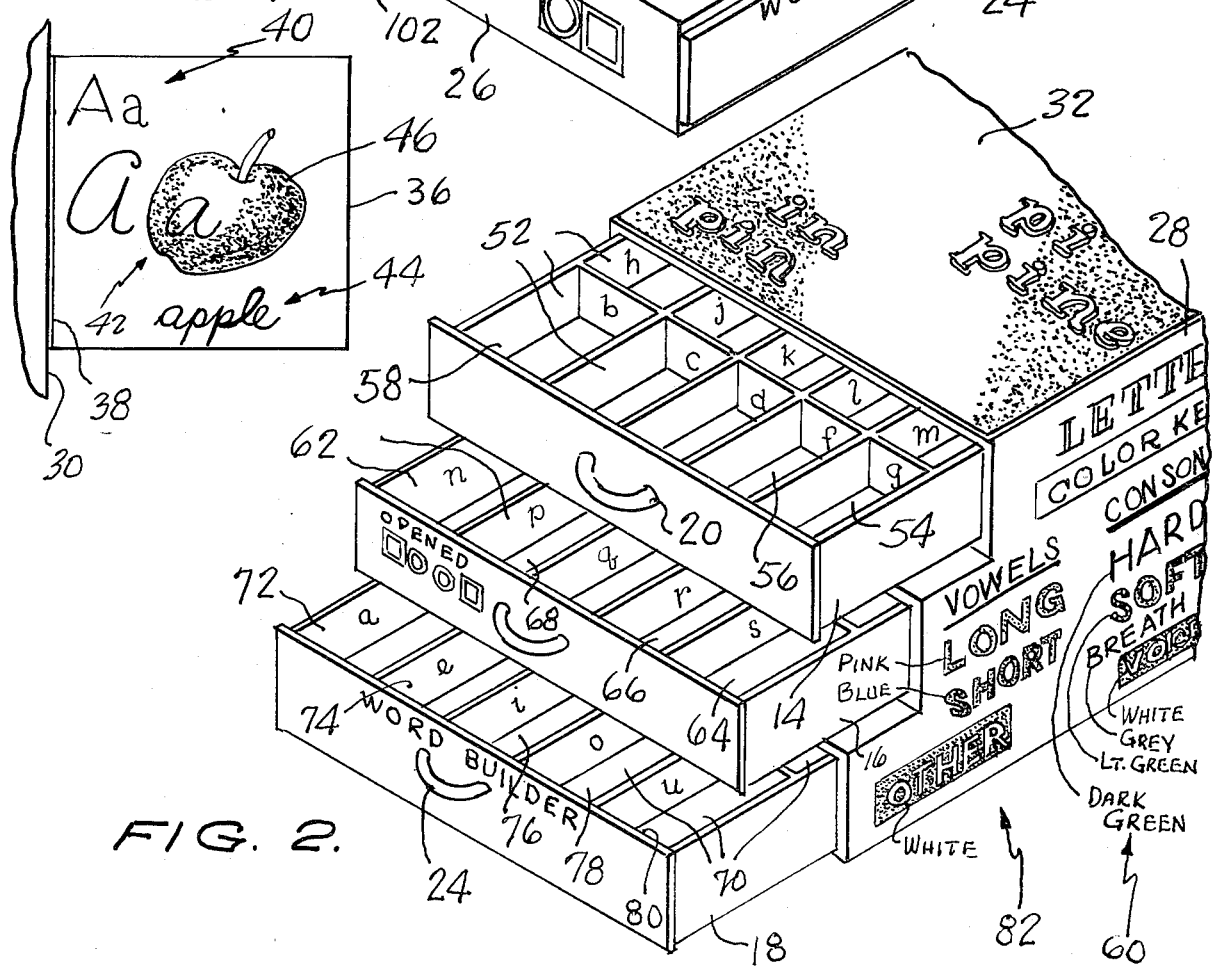

FIG. 3.

{ a e i o u   OTHER WHITE
  ā ē ī ō ū   LONG PINK
  ă ĕ ĭ ŏ ŭ   SHORT BLUE }

FIG. 4.

◯ VOWEL

▢ CONSONANT

FIG. 5.

{ [c] (ā)        OPEN —92

(ā) [n]       CLOSED —94

[c] (ă) [n]   CLOSED —96

[c] (ā) [n] (e)   OPENED —98

[c] (ā) (i) [n]   OPENED —100

[c] (ă) [n] [n] (e)   CLOSED —102

[c] (ă) [n]-[n]-(i) ng   CLOSED —104 }

FIG. 6. { a
              ay
              ey
              eigh
              ei }

FIG. 8.

| chin | then | though (ō) | (ā) |
| shin | when | through (oō) | say |
| thin |      | thought (aw) | feint |
|      |      | rough (uff) | neigh |
| hand |      | bough (ow) | hey |
| handy |     | trough (off) | they |
| unhandy |   | handy·i·er | |
| ↙90 | ↙88 | ↙86 | ↙84 |

WORD BUILDING TEACHING AID

BACKGROUND OF THE INVENTION

1. Field of the Invention

The present invention is related to educational and teaching devices and, more particularly, is directed towards a teaching aid which is especially designed to assist slow learning children in forming, pronouncing and spelling English words.

2. Description of the Prior Art

A child learning phonics and spelling needs to be able to distinguish between long, short and other vowel sounds, and to be able to recognize the three consonants that change from hard to soft in different contexts. Additionally, although not as readily achievable, a student should be able to recognize and distinguish between sounds which may be characterized as "breath" sounds and "voice" sounds.

The need for having an effective teaching aid in the above-noted areas is especially evident in teaching reading to bilingual, slow or retarded students. For example, most of these students have a great deal of trouble forming and pronouncing verbs in the past tense, as well as nouns in the plural form. In a word like "jumped", for example, they will strive to force an unnatural "d" sound by saying "jump-ted" or the like. It becomes necessary, therefore, to be able to convey to such students that, since the "p" in "jumped" is a "breath" sound, the only natural way to pronounce the past tense ending is to allow it to become a "t" sound. In contrast, in a word such as "fanned", it is natural to pronounce the "d" correctly since "n" is a "voice" sound like "d".

Such students have similar problems in learning phonics.

While there are many fine reading textbooks and teachers' manuals available which spell out the standard steps necessary to develop these skills in a normal student, none to my knowledge are capable of reaching the slow students, or are only partially effective with many average students. While bright and intelligent students are, in contrast, easily taught by any logical step-by-step approach, since their minds will make any necessary connections between steps and will recall what has already been taught, in order to teach slow and average students I have found that one needs to saturate the mind with many approaches and use whichever may be called for at any given time to bring about an understanding that the student is striving for (or even resisting).

Precious few teaching aids are directed towards the slow or average students, and it is towards this end that the present invention is advanced. I have found it to be particularly useful to have a teaching aid which permits the slow or average student to experience a variety of physical sensations, including sight, sound, and tactile, during this learning process.

Prior art United States patents in this general area of which I am aware include: Nos. 217,566; 293,731; 1,162,629; 3,654,712; 3,715,812; 3,813,471; and 4,007,548.

OBJECTS AND SUMMARY OF THE INVENTION

It is therefore a primary object of the present invention to provide an educational device which is particularly designed to assist slow or average students in spelling, phonics and reading, and which overcomes all of the deficiencies noted above with respect to prior art devices and techniques.

Another object of the present invention is to provide a teaching aid particularly for slow students which assists in learning, reading, spelling and pronunciation, and which appeals to many different senses of the student.

A further object of the present invention is to provide a novel and unique word building teaching aid which clarifies the formation and pronunciation of words, and includes means for readily distinguishing between long and short vowels, soft and hard consonants, and open and closed syllables.

An additional object of the present invention is to provide a simple and compact teaching aid which may be readily and inexpensively constructed of conventional materials, and which is versatile and permits teaching approaches from many different angles in a manner which is particularly appealing to the slow or average learner.

An additional object of the present invention is to provide a word building teaching aid which readily and easily appeals to both the visual and tactile senses of a student by demonstrating how words may be formed and how one word may be changed to another by simply moving a letter or group of letters, and/or replacing a letter with another.

Another general object of the present invention is to provide an aid for teaching slow students on an individual basis which adds interest and clarity to a multitude of word-attack skills or approaches.

The foregoing and other objects are attained in accordance with one aspect of the present invention through the provision of a word building teaching aid which comprises a housing having at least one drawer movable therein. The drawer includes a plurality of divided compartments including one labeled for each letter of the alphabet. A plurality of letter pieces are adapted for storage within correspondingly labeled compartments. The letter pieces include sets of vowel letter pieces and sets of consonant letter pieces. The vowel letter pieces in each set are provided in three different colors to represent long, short and other vowel usages, while the consonant letter pieces are also color coded to represent breath or voice sounds and hard or soft consonant usages.

In accordance with other aspects of the present invention, the letter pieces further include prefix letter pieces and suffix letter pieces, each of which may include two or more coupled letters which together comprise a prefix or suffix, the prefix and suffix letter pieces also being color coded in accordance with the sound they might make in different words in which they are used. In addition, other grouped letter pieces, each of which may include two or more letters physically coupled together, may be provided and color coded in accordance with the possible sounds they make in different words.

In accordance with other aspects of the present invention, the housing includes a substantially planar top surface formed of a high friction material, such as flannel, so that the letter pieces will readily stay in position thereon. The housing also preferably includes at least three drawers horizontally movable therein, two of the drawers being divided to contain the consonant letter pieces, the third drawer being divided to contain the vowel letter pieces, the prefix and suffix letter pieces, and the miscellaneous letter pieces.

The housing also preferably includes first and second side panels, the first side panel having imprinted thereon the color code for the vowel and consonant letter pieces. The second side panel preferably has imprinted thereon a syllable code for facilitating long and short vowel pronunciation in various letter and syllable combinations. The syllable code more particularly provides one shape for representing a consonant and another shape for representing a vowel, the vowel shape being further color coded in the same manner as the vowel letter pieces for short and long vowel sounds.

In accordance with yet another aspect of the present invention, a plurality of phonics cards are preferably attached to the rear wall of the housing, each of the phonics cards having a letter or letter combination imprinted thereon along with a picture and the spelling of an article that uses the letter or letter combination. The cards are preferably planar and are hingedly mounted to the rear wall along one edge thereof so as to be pivotable, much as the leaves of a book.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings in which:

FIG. 1 is a perspective view of a preferred embodiment of the word building teaching aid of the present invention;

FIG. 2 is a fragmentary perspective view of the preferred embodiment illustrated in FIG. 1 showing the drawers slightly opened;

FIG. 3 is a plan view of certain letter pieces utilized with the present invention;

FIG. 4 illustrates a code utilized in syllable pronunciation in accordance with the teachings of the present invention;

FIG. 5 is a diagram which illustrates the utilization of the syllable code of the present invention;

FIG. 6 illustrates a grouping of various letter pieces which are preferably provided with the present invention;

FIG. 7 is a plan view of a phonics card which is yet another portion of a preferred embodiment of the present invention; and FIG. 8 is a representation which is helpful in understanding the manner in which the present invention may be utilized.

DETAILED DESCRIPTION OF THE PREFERRED EMBODIMENT

Referring now to the drawings, wherein like reference numerals represent identical or corresponding parts throughout the several views, and more particularly to FIG. 1 thereof, the word building teaching aid of the present invention is indicated generally by reference numeral 10.

The teaching aid 10 includes a case 12 which may be constructed of any suitable material. Case 12 is arranged in three tiers and includes a top drawer 14, a middle drawer 16 and a bottom drawer 18. The top, middle and bottom drawers 14, 16 and 18 are each provided with a handle 20, 22 and 24, respectively, to facilitate the opening of same.

The case or housing 12 further includes a substantially planar left side wall 26 which has imprinted thereon certain information and indicia which will be described in greater detail hereinafter.

Similarly, as illustrated in FIG. 2, the case 12 includes a substantially planar right side wall 28 which also has indicia or information imprinted thereon. The exact nature and function of such information will be described in greater detail below.

The housing 12 also includes a rear wall 30 and a top, substantially horizontal work surface 32. Work surface 32 is preferably covered with a high friction felt or flannel material, to provide resistance against movement of letters to be placed thereon in a manner to be described in greater detail hereinbelow.

On the rear wall 30 of case 12 are provided a plurality of individual cards or boards which are indicated generally by reference numeral 34. The boards 34 are preferably arranged in two rows, each row consisting of nine cards, and have phonics information imprinted thereon. The cards may be made of any suitable materials, such as canvas, and are mounted to the rear wall 30 in a book-leaf fashion.

For example, referring to FIG. 7, one of the sides of a board 36 is illustrated. This side of board 36 may be attached, for example, by sewing its rear edge 38 onto the rear wall 30 of case 12. Board 36 illustrates certain phonics information for the letter a. Specifically, reference numeral 40 indicates generally the proper formation of the upper and lower case block letters, while reference numeral 42 indicates the proper upper and lower case formation of the script letters. Reference numeral 44 spells out a script word using the letter "a" in the first position, while a pictorial representation 46 of the word 44 is also illustrated. For most of the boards 34, the letter on the card represents the beginning sound of the name of the article pictured. In case of the letter "x", a closing sound is utilized. Since a total of eighteen cards are utilized in the preferred embodiment (two rows of nine cards each), a total of 36 faces are available. Some of the extra cards, above and beyond the 26 letters of the alphabet, are utilized to illustrate prefixes, suffixes, and certain letter combinations common to the middle of a word. Reference numeral 48 in FIG. 1, for example, indicates the "R" phonics card which illustrates and spells the word "ring" while reference numeral 50 indicates the beginning sound "wh" and spells the word "whistle" while illustrating same. The vowel cards, such as card 36 of FIG. 7, preferably show only short sounds since the student may be told and easily learn that when a vowel is long it says its own name.

Referring now to FIG. 2, the top drawer 14 is seen to be divided into ten compartments 52 by suitable vertical dividers. Each compartment 52 in drawer 14 has a consonant labeled thereon for identifying the letter pieces which shall be stored therein. Each drawer is then filled with three-dimensional letter pieces. For example, compartment 54 is filled with a plurality of letter pieces shaped as the letter "g". The letter pieces in compartment 54 are preferably formed of papier-mache and are dipped in a plaster and gelatin mixture prior to painting to ensure adherence to the flannel board 32.

Each of the consonants are color coded in accordance with the code or legend 60 which is imprinted on side 28 of box 12. More particularly, consonants that make a hard sound are colored, for example, dark green, while consonants which make a soft sound are colored light green. Utilizing the letter "g" as an example, compartment 54 would be filled with both dark green and light green letter pieces shaped as "g", the dark green "g"s being used to form words such as "gun", while the light green "g"s are used to form words such as "orange".

Out of the 20 consonants in the English language, three consonants can be pronounced either hard or soft. As we have seen, the letter "g" is one of the letters, while the consonants "s" and "c" are the other two.

The remaining consonants are colored either white or gray depending upon whether they may be used as a "voice" sound or as a "breath" sound. For example, the compartment 56 is for the letter pieces "f" which always form a "breath" sound. Therefore, all of the "f" letter pieces are gray in color.

Compartment 58 contains the "b" letter pieces, which are all white in color since they always produce "voice" sounds and are always pronounced the same way.

It so happens that each of the three consonants which may be pronounced either hard or soft ("g", "s" and "c") always provide "voice" sounds, and therefore a thin white stripe is preferably provided over each of these light green or dark green consonants to indicate the "voice" code.

The middle drawer 16 is also divided into ten compartments 62 for housing the letter pieces corresponding to the remaining ten consonants. Compartment 64, for example, is labeled the "s" drawer and contains both dark green letter pieces (e.g., "dress") and light green letter pieces (e.g., "shape"). Compartment 66 contains a plurality of "r" letter pieces which are all white to indicate "voice" sounds, while compartment 68, for example, contains "p" letter pieces which are all gray.

The bottom drawer 18 preferably contains fifteen compartments indicated by reference numeral 70. The first row of compartments in bottom drawer 18 are for the five vowels. That is, compartment 72 houses the "a" letter pieces, compartment 74 houses the "e" letter pieces, compartment 76 houses the "i" letter pieces, compartment 78 houses the "o" letter pieces, and compartment 80 houses the "u" letter pieces.

Additional compartments in drawer 18 house the "y" letter pieces, in addition to many miscellaneous prefixes, suffixes, and other letter combinations, as will be described in greater detail hereinafter.

The vowels in compartments 72, 74, 76, 78 and 80 are also color coded in accordance with the legend indicated generally by reference numeral 82 which appears upon the side 28 of housing 12. As illustrated clearly in FIG. 3, compartment 72 would contain at least three different color "a"s, one which is pink to indicate use as a long vowel (e.g., "cape"), one which is blue to indicate use as a short vowel (e.g., "cap"), and one which is white to indicate other uses of the vowel (e.g., "army"). The same three colors are also provided for the remaining vowels, and preferably a plurality of each color are provided in each compartment to facilitate the formation of many words at a time.

Directly behind compartment 72 is another compartment (not illustrated) which contains groups of letters which make a long "a" sound, such as those letter groups illustrated in FIG. 6. The letters "a" and "y" in the grouping "ay" are preferably attached together so that the "ay" is used and moved by the student as a group. The same holds true for the letters in the group "ey", "eigh", and "ei". In keeping with the color legend 82, each of the letter pieces of FIG. 6 are pink to indicate the long vowel sound that they make in words such as indicated by reference numeral 84 in FIG. 8.

Another compartment in the lower drawer 18 may contain, for example, a plurality of differently-colored "ough" letter groupings. For example, a pink "ough" would be utilized to form the word "though", while a white "ough" would be utilized to form the word "through". Other pronunciations and usages of the letter grouping "ough" are illustrated in FIG. 8 by reference numeral 86, and evidences the value of the color coding according to long or short sounds.

Yet another compartment in the lower drawer 18 may contain a plurality of "—h" prefixes, such as "ch", "sh", "th" and "wh". Some of the "—h" prefixes may be both gray and white (e.g., "th" in gray for the word "thin" and in white for the word "then").

The remaining compartments may contain other common prefixes, suffixes and difficult changing sound word groups which may be utilized to build many different words as illustrated in FIG. 2 and FIG. 8 as at 90. The fact that certain letters are always coupled together physically, and are color coded, makes them particularly noticeable in forming words on the top surface 32 of box 12, and add to the learning experience. In use, a student may start with a group of white letters and may then add a bit of color to call attention to changes that the colored letters make. Further, inherent differences in the letters makes them quite noticeable. The various learning exercises which may be utilized with the apparatus thus far described are varied and multitudinous, and may be designed to fit a particular student's desires and capabilities.

Another feature of the present invention is the provision on side 26 of box 12 of a syllable code. As illustrated in FIG. 4, a vowel in this code is represented by a circle, while a consonant is represented by a square. The syllable code on side 26 of the teaching aid may be best utilized with a chalk board or other auxiliary writing implement, but it helps to illustrate the changes in vowel sounds which may be caused by the addition of another vowel or consonant or the rearranging of same. The color code for long and short vowel sounds indicated by reference numeral 82 is maintained in the syllable code on side 26. Referring to FIGS. 1 and 5, reference numeral 92 indicates an "open" syllable in which the vowel "a" is long. Reference numeral 94 indicates a "closed" syllable where the vowel "a" is short. Reference numeral 96 indicates another "closed" syllable which indicates the common condition of having a short vowel enclosed or sandwiched by two consonants. Reference number 98 indicates what I call an "opened" syllable where the vowel "a" becomes long by the addition of the silent vowel at the end. Likewise, reference numeral 100 indicates another "opened" syllable where the vowel "a" becomes long by the adjacent vowel "i" which is silent. Reference numeral 102 indicates a "closed" syllable with a short vowel as a result of the double consonant, and the last reference numeral 104 also indicates a "closed" syllable whose vowel holds its short pronunciation due to the addition of the second "n".

Naturally, it must be pointed out to the student that the syllable code on side 96 holds true on single syllable words and, concerning the doubling of the consonant, only holds on accented syllables in longer words. Further, as with all phonics rules, there are exceptions. The specific usage of the present invention will be, it is presumed, in the hands of a teacher of ordinary skill in the art.

It therefore should be appreciated that numerous modifications and variations of the present invention are possible in light of the above teachings. Thus, it is understood that within the scope of the appended claims the invention may be practiced otherwise than as specifically described herein.

I claim as my invention:

1. A word building teaching aid, which comprises: a housing having at least one drawer movable therein, said drawer including a plurality of divided compartments, said compartments including one label for each letter of the alphabet, and a plurality of letter pieces adapted for storage within its corresponding labelled compartment, said letter pieces including sets of vowel letter pieces and sets of consonant letter pieces, said vowel letter pieces in each set being provided in three different colors to represent long, short and other vowel usages, said consonant letter pieces also being color coded to represent breath or voice sounds and hard or soft consonant usages, said housing further including first and second side panels, said first side panel having imprinted thereon the color code for said vowel and consonant letter pieces.

2. The word building teaching aid as set forth in claim 1, wherein said letter pieces further include prefix letter pieces and suffix letter pieces each of which may include two or more coupled letters which together comprise a prefix or suffix, said prefix and suffix letter pieces also being color coded in accordance with the sound they might make in different words in which they are used.

3. The word building teaching aid as set forth in claim 2 wherein said suffix or prefix letter pieces of coupled letters are three-dimensional and in the form of the letters comprising said prefixes and suffixes.

4. The word building teaching aid as set forth in claim 1, further comprising sets of grouped letter pieces, each of said sets including two or more letters physically coupled together and being color coded in accordance with the possible sounds said grouped sets may make in different words.

5. The word building teaching aid as set forth in claim 4 wherein said grouped letter pieces are three-dimensional and in the form of the letters of said group.

6. The word building teaching aid as set forth in claim 1, wherein said housing includes a substantially planar top surface, said top surface being formed of a high friction material whereby said letter pieces will stay in place thereon.

7. The word building teaching aid as set forth in claim 1, wherein said housing includes at least three drawers horizontally movable therein, two of said drawers being divided to contain said consonant letter pieces, the third drawer being divided to contain said vowel letter pieces.

8. The word building teaching aid as set forth in claim 1, wherein said second side panel has imprinted thereon a syllable code for facilitating long and short vowel pronunciation in various letter and syllable combinations.

9. The word building teaching aid as set forth in claim 8, wherein said syllable code provides one shape for representing a consonant and another shape for representing a vowel, said vowel shapes being further color coded in the same manner as said vowel letter pieces.

10. The word building teaching aid as set forth in claim 1 wherein said letter pieces are three-dimensional and in the form of said letters.

11. A word building teaching aid, which comprises: a housing having at least one drawer movable therein, said drawer including a plurality of divided compartments, said compartments including one labeled for each letter of the alphabet, and a plurality of letter pieces adapted for storage within its corresponding labeled compartment, said letter pieces including sets of vowel letter pieces and sets of consonant letter pieces, said vowel letter pieces in each set being provided in three different colors to represent long, short and other vowel usages, said consonant letter pieces also being color coded to present breath or voice sounds and hard or soft consonant usages, and a plurality of phonics cards hingedly mounted to a rear wall of said housing along one edge thereof so as to be pivotable, each of said phonics cards having a letter or letter combination imprinted thereon along with a picture and spelling of an article using said letter or letter combination.

* * * * *